United States Patent
Ghosh et al.

(10) Patent No.: US 8,343,282 B2
(45) Date of Patent: Jan. 1, 2013

(54) PHOTOCATALYTIC AUTO-CLEANING PROCESS OF STAINS

(75) Inventors: Pushpito K. Ghosh, Bhavnagar (IN); Raksh V. Jasra, Bhavnagar (IN); Dipak B. Shukla, Bhavnagar (IN); Anjani K. Bhatt, Bhavnagar (IN); Rajesh J. Tayade, Bhavnagar (IN)

(73) Assignee: Council of Scientific and Industrial Research, New Delhi (IN)

(*) Notice: Subject to any disclaimer, the term of this patent is extended or adjusted under 35 U.S.C. 154(b) by 0 days.

(21) Appl. No.: 12/649,760

(22) Filed: Dec. 30, 2009

(65) Prior Publication Data

US 2011/0011419 A1 Jan. 20, 2011

Related U.S. Application Data

(63) Continuation of application No. 11/025,676, filed on Dec. 28, 2004, now abandoned.

(51) Int. Cl.
*B08B 7/00* (2006.01)

(52) U.S. Cl. ............... 134/1; 134/42; 204/157.15

(58) Field of Classification Search ............... 134/1, 1.3, 134/42; 204/157.15
See application file for complete search history.

(56) References Cited

U.S. PATENT DOCUMENTS

| | | | | |
|---|---|---|---|---|
| 1,968,204 | A | * | 7/1934 | Hazlehurst .................. 428/142 |
| 5,780,380 | A | * | 7/1998 | Endoh et al. ................. 502/300 |
| 5,874,701 | A | * | 2/1999 | Watanabe et al. ........ 204/157.15 |
| 6,306,361 | B1 | * | 10/2001 | Shin et al. ..................... 423/610 |
| 6,343,400 | B1 | * | 2/2002 | Massholder et al. ............ 15/105 |
| 6,582,839 | B1 | * | 6/2003 | Yamamoto et al. ........... 428/702 |
| 2002/0107144 | A1 | * | 8/2002 | Fujishima et al. ............ 502/350 |

OTHER PUBLICATIONS

Yiming Xu; Wei Zheng; Weiping Liu, Enhanced photocatalytic activity of supported TiO2: dispersing effect of SiO2, 1999, Journal of Photochemistry and Photobiology A: chamistry 122 (57-60).*

* cited by examiner

*Primary Examiner* — Saeed T Chaudhry
(74) *Attorney, Agent, or Firm* — Merchant & Gould P.C.

(57) ABSTRACT

The present invention provides a process for photocatalytically treating stains of chilly and turmeric caused on kitchen tiles and platforms by coating a thin film of photocatalyst made of a semiconductor such as titanium dioxide uniformly dispersed in dilute silica sol thereon and using a light source such as a fluorescent lamp to irradiate and photoexcite the photo catalytic thin film by the small amount of UV radiation included in the fluorescent light, resulting in photo decomposition and auto-cleaning of the stains.

20 Claims, No Drawings

PHOTOCATALYTIC AUTO-CLEANING PROCESS OF STAINS

CROSS REFERENCE TO RELATED APPLICATIONS

The present application is a Continuation of U.S. patent application Ser. No. 11/025,676, filed on Dec. 28, 2004, which is hereby incorporated by reference in, its entirety.

FIELD OF THE INVENTION

The present invention relates to photocatalytic oxidation of spices with titanium dioxide coated on ceramic tiles and in particular relates to reliable and successful use of $TiO_2$ coated ceramic tiles and in-house fluorescent light to degrade persistent stains caused by splashing, spilling of chilies and turmeric on the walls/platform of kitchens.

BACKGROUND OF THE INVENTION

Fluid streams such as water or effluents often include contaminants such as dissolved halogenated or organic compounds, nitrogen oxides, halocarbons, pesticides, organic dyes, etc. Photocatalysts can be used to purify fluid streams by converting these contaminants into less harmful materials or substances, which may be more easily removed therefrom.

The conversion of contaminants occurs when the effluent or toxic pollutant is brought in contact with the photocatalyst illuminated by a nearly ultra-violet or fluorescent light source. The photocatalyst is either in the coated form or in dispersed form. Typically, photocatalyst is deposited on the surface of a support structure to provide a stable photo catalytic surface and to ensure that the flowing stream does not carry it away. To be effective, the contaminants must be brought into contact with the photocatalyst.

The photocatalytic oxidation reaction with $TiO_2$ either in coated or dispersed form has been known for some time. A synthetic and commercially available $TiO_2$ containing greater than 75 per cent of anatase can be used as a photocatalyst to degrade various organic species to render it environmentally safe. These $TiO_2$ either coated on support material or dispersed in aqueous solution have been found to have good photocatalytic degradation efficiencies when it is desired to impact oxidation or reduction properties to organic moieties. Titanium dioxide have specific properties for its use as a photocatalyst such as (i) oxidation of water-bound environmental contaminants, irradiated with solar or simulated light; (ii) complete photo degradation of halocarbons, viz. dibromo-ethane, trichloroethylene; chloro-benzenes etc widely used as solvents in pesticides, insecticides, herbicides; (iii) photo destruction of different classes of organic dyes and biological stains from waste water; (iv) oxidation of cyanide found in rinse water of steel industry, electroplating, gold extraction, extraction in mines, to less toxic oxidation products like OCN. The latter is further oxidized to $NO^{3-}$ and $CO_3^{2-}$; (v) reduction of metal ions to metallic state to remove toxic and noble metal ions from waste water; (vi) photo destruction of anionic, cationic and non-ionic surfactants under solar or simulated light using aqueous $TiO_2$ suspensions.

The wide spectrum of surface properties such as crystallinity, high percentage of anatase, surface charge state, surface hydration/hydroxylation, combined with fine particle size and high surface area, low density and chemical inertness make titanium dioxide a potential industrial photocatalyst in the field of photo/environmental chemistry. Such a $TiO_2$ in its porous state can be employed for the photo catalytic oxidation reaction employing simple method described hereinto.

The inorganic molecules and ions, viz. $CO_2$, $SO_2$, $NO_3$, $NH_4^+$ are the reaction products of photocatalytic oxidation reaction on $TiO_2$ surfaces. Under favourable conditions, the organic species present in (i) waste water effluents (ii) halo carbons (iii) dyes and dye stuff (iv) surfactants (v) toxic pollutants etc. undergoes photocatalytic oxidation reaction, when the $TiO_2$ surface is irradiated with ultra violet or fluorescent tube-light.

U.S. Pat. No. 5,035,784 (1991) to M. A. Anderson et al. has disclosed the preparation of a highly porous titanium ceramic membrane and which have the propensity to absorb organic molecules, and also to degrade the complex organic molecules under UV light. The preparation involves hydrolysis of titanium alkoxide at room temperature in organic alcohol. The addition of large amount of water will precipitate titanium hydroxide, which is then peptized with $HNO_3$ at room temperature. The suspension is heated with stirring at 85° C. and maintained it for 12 hours, whereby the colloid gel is solidified onto a support which on firing at 500° C. results in a highly porous, continuous web of sintered particles forming a rigid membrane. The drawback associated with this processes are (i) tight control of pH of the colloidal mixture; ii) any alcohol as solvent will not be adequate. The alcohol solvent is preferably an alkyl alcohol different from alkyl radical in titanium alkoxide and (iii) the firing temperature is critical as it may cause as it may cause cracking into the resulting ceramic.

U.S. Pat. No. 5,874,701 (1999) to T. Watanabe at al. discloses a process for photo catalytically treating hospital room or living space contaminated by bacteria or an interior space bearing airborne malodorous substances. It comprises of a thin film of TiO2 coated on the inner walls of the room, which is irradiated by a fluorescent lamp and photo excited by small amount of UV radiation included in the light of the lamp. The wattage of fluorescent lamp, distance between the thin film and lamp, intensity of UV light were studied to photo decompose the bacteria and chemical compounds deposited on the photo excited thin film. This process has the limitation that it can photo decompose bacteria and hazardous chemical compounds (airborne) substances. It does not claim anything about auto cleaning of stains caused by spices on kitchen walls and platforms.

U.S. Pat. No. 5,779,912 (1998) to A Gonzalez Martin et al. discloses a method and apparatus for mineralizing organic contaminants in water or air by photocatalytic oxidation in a unique two-phase or three-phase boundary system in a photocatalytic reactor, which works effectively at ambient temperature and low pressure. The semi-conductor $TiO_2$ is coated by different technique on porous substances viz. porous polymers; porous metal; porous carbon or graphite; or porous ceramic in order to have passage there through for different oxidant, used in different proportion in the decomposition process. The drawback associated with this process is that the system is effective when binary metal oxides are selected as photocatalyst, and at low pressure. The presence of oxidant is quintessential for photodecomposition.

Japanese Patent No 9,276,694 (1997) to O. Taware discloses a method which involves the preparation of a paste from $TiO_2$, glass powder and water and applying a thin film of this paste on ceramic surface prior to calcination, in order to obtain a stiff and less porous $TiO_2$ layer that has strong adherence to substrate and long service life. The drawback associated with method is that this photocatalyst is compatible for decomposition of nitrogen and phosphorous compounds, for cleaning air, exhaust gas and water.

OBJECTS OF THE INVENTION

The main object of the invention is to provide a method for photocatalytic oxidation of spices with $TiO_2$ coated on ceramic tiles, which obviates the drawbacks and limitations as detailed above.

Another object of the invention is auto-cleaning of stains caused by spurting of spices on kitchen walls and platforms, where it is not easily reachable manually.

Another object of the invention is to provide stable deposition of photocatalyst on surface of substrate and to ensure that photocatalyst is not removed by flowstream of effluent.

Another object of the invention is to make the degradation of spices more effective even in the presence of fluorescent light.

Another object of the invention is to use anatase type of $TiO_2$ and the like $TiO_2$ as Photocatalysts.

Another object of the invention is to provide a simple and efficient method of coating a support material, while avoiding complexities involved of known coating techniques.

SUMMARY OF THE INVENTION

Accordingly the present invention provides a process for degradation of stains caused by spices with $TiO_2$ coated on ceramic tiles, which comprises of (i) spraying of 2 to 5% of $TiO_2$ powder dispersed in 5 per cent silica sol on rough surface of ceramic title; (ii) drying and heating the tiles in the temperature range of 100 to 350° C. for 20 to 60 minutes; (iii) again spraying and drying/heating the titles as in step (ii); (iv) placing droplets of slurry containing dispersed chilly or turmeric in water or an emulsion with oil containing dispersed chilly or turmeric in the concentration range of 1 to 5 per cent, on the coated ceramic title; (v) exciting the $TiO_2$ surface with ordinary fluorescent light having an intensity in the range of 5 to 20 lux, for effective contact time in the range of 20 to 80 minutes.

In an embodiment of the invention, the photocatalyst such as $TiO_2$ is in powder form and contains at least 80% by weight of anatase type $TiO_2$; surface area in the range of 25 to 60 m2g-1 and X-ray diffraction peaks at $2\theta=25.35$ A°; 37.88 A° and 48.15 A°.

In another embodiment of the invention, the support material is a ceramic tile, plane glass or a hard acrylic sheet.

In yet another embodiment of the invention, $TiO_2$ powder in the range of 2 to 5% is dispersed in 5 to 10% silica sol and then sprayed on support material.

In another embodiment of the invention, the coated ceramic title is heated in the temperature range of 100 to 350° C. for 5 a period in the range of 20 to 60 minutes.

In another embodiment of the invention, the spices tested are chilly and turmeric either in water dispersion or emulsion with oil in the concentration range of 1 to 5%.

In another embodiment of the present invention, the fluorescent light is varied in the range of 50 to 350 lux.

In another embodiment of the invention, the irradiation time is varied in the range of 20 to 50 hours.

DESCRIPTION OF THE INVENTION

In the present investigation, titanium dioxide which is useful in the practice of this invention and which is photo catalytically more active belongs to a class known as anatase-type $TiO_2$. In general $TiO_2$ exist as a mixture of anatase and rutile, with rutile content in minor proportion. The anatase and rutile-type titanium dioxide are characterized by a tetragonal type crystal structure. The anatase-type $TiO_2$ and rutile-type $TiO_2$ have lattice constant a=3.78 A and c=9.49 A and a=4.58 A and c=2.95 A respectively. A particular desirable type of; from which a stable coating as well as photo catalysis oxidation reaction can be carried out, is the anatase-type of $TiO_2$ and the like $TiO_2$. These $TiO_2$, have fine particles wherein 100% particles are finer than 20 microns and has BET surface area in the range of 30 to 60 $m^2g^{-1}$. Titanium dioxide is a crystalline material and exhibits definite peak position at $2\theta=25.35$, 37.88 and 48.15 as seen from X-ray powder diffraction pattern. A typical, synthetic and commercially available $TiO_2$ has about 75 per cent of anatase-type $TiO_2$ with the remainder of its composition being rutile-type TiO2.

The titanium dioxide of anatase type has a band gap energy of 3.2 electron volts, which corresponds to ultra violet (UV) light of 388-nanometer wavelength. The titanium dioxide of rutile type has a band gap energy of 3.0 electron volts, which corresponds to UV light of 413-nanometer wavelength. Therefore, this $TiO_2$ possesses a band gap energy, which requires minimum energy of light to produce conduction band electrons and valence band holes. The holes developed on the $TiO_2$ surfaces reacts with water to provide highly reactive hydroxyl radical (.OH). The holes and the hydroxyl radicals are powerful oxidants and are capable of oxidizing most of the organic materials.

In addition to the $TiO_2$ mentioned above, it has been found in the course of this invention that $TiO_2$ having different origin and having different proportion of anatase and rutile are also useful in the photocatalytic oxidation provided that it possesses the inherent characteristics, viz. (i) promotion of electron when irradiated with the available photons under normal condition of illumination in a household, (ii) capable of forming a hydroxyl radical and super-oxide ions and (iii) formation of colloidal dispersion for easy application and maximizing light absorption efficiency. The $TiO_2$ surfaces are positively charged in acidic medium and negatively charged in alkaline medium. These surfaces to varying degrees are capable of attraction or repulsion with the oxidizing substrate.

The preparation of thin film $TiO_2$ on ceramic tile, is carried out by first dispersing the $TiO_2$ powder in demineralized waster to produce a dilute slurry. Prior to coating/layer formation by spray technique the surfaces of ceramic tiles are mechanically made rough. The layer ceramic tiles are first heated in an electric oven to remove the adhering water and then calcined in muffle furnace in order to obtain a strong adherence of $TiO_2$. Strength of adherence of $TiO_2$ to the surface of the tile was tested by 1) keeping the tile under waters of different pH (4-10) and measuring the adhered $TiO_2$ on the tile 2) keeping the tile under water at different temperatures (60-70° C.) measuring the adhered $TiO_2$ on the tile 3) keeping the tile under flowing tap water for 2 hours and measuring the adhered $TiO_2$ on the tile 4) applying adhesive tape on the tile and checking the removal of $TiO_2$ from the tile.

Most of the titanium dioxide exhibit in their natural state the photocatalytic activity when excited with UV light or fluorescent light. Ordinary room light also comprises of a UV component with requisite features. The rutile-type $TiO_2$ depicts lower photocatalytic activity while a much higher activity can be seen when anatase-type $TiO_2$ is used as a photocatalyst. It has been found that anatase-type $TiO_2$ with higher photo activity can be prepared by subjecting the $TiO_2$ powder to controlled thermal treatment prior to coating the ceramic tiles.

In common practice, a coating/layer of $TiO_2$ on support material can be prepared by applying a smooth paste, removing the excess $TiO_2$ and heating/firing at higher temperature. Other methods of thin layer formation are spray pyrolysis, chemical vapour deposition, plasma enhanced vapour deposition. In the practice of this invention, another simple method of preparing a stable coating which can be employed is by spraying the particles uniformly dispersed in demineralized water and subsequently heating and firing at higher temperature. The photoactive agent can also be incorporated under the file manufacturing process, particularly during the glazing step.

In general, the photocatalytic reaction between the excited surface and the organic spices present in turmeric and chilly powder can be carried out under the influence of a weak light in a room. According to this invention, improved photocatalytic properties, i.e., higher efficiency can be obtained when the thin $TiO_2$ layer is activated either by a fluorescent lamp, an incandescent lamp, or sunlight through a window. It is understood that higher efficiency of anatase-type $TiO_2$ for degradation of organic species depends significantly upon the energy band gap, which is ca. 3.2 eV. The band gap energy for such $TiO_2$ photocatalyst is the minimum energy of light required to make the material electrically conductive. The photoreaction under controlled light leads to surface excitation and simultaneously to the destruction of chromophoric organic species present in turmeric and chilly. The latter can be either in a mixture form with water or can be an emulsion with oil and water as is normally the case during cooking of a variety of dishes.

According to the present invention, there is provided a process for photo-catalytically treating the stains caused by spilling chilly and turmeric in water or emulsion in oil on kitchen tiles and platforms.

The first feature of the photocatalytic process, according to the invention is that photocatalyst is in the form of thin film of a solid-state semiconductor material is provided on the entire surface of the interior walls and platform to ensure that the reaction surface is available for photo-catalysis. The tiles and platform coated with thin film of photocatalyst and in the presence of fluorescent light, may be regarded as a large photocatalytic reactor. This is particularly advantageous when the process according to the invention is carried out for the purpose of auto-cleaning of stains caused by spilling of chilly and turmeric either in water or emulsion in oil. Stains caused by chilly and turmeric are auto cleaned in situ by the action of photocatalyst, upon contact with the wall surface coated with the photocatalytic thin film, cleaning effect via photo decomposition can be efficaciously accomplished.

The second feature of this photodecomposition process according to the present invention resides in that the photocatalyst is excited by making use of an electric lamp, such as fluorescent lamps, which is provided in the room. This fluorescent lamp includes a small amount of UV radiation of a wavelength range having the light energy higher than the band gap energy of the semiconductor photocatalyst. Therefore, the fluorescent lamp may be used for the purpose of photo excitation of the photocatalyst ($TiO_2$) in addition to its intended general purpose of illumination. Since the fluorescent lamp includes small amount of UV radiation, the process of photodecomposition dispenses the need for a separate UV light source. Accordingly the thin film of photocatalyst may be exposed to illumination for the purpose of photo excitation as described hereinbefore to ensure that the photocatalytic thin film be disposed on the tile surfaces which is easily accessible to people.

The third feature of the present invention is related to the quantum yield of the light energy absorbed by the semiconductor photo catalyst. It is the ratio between the number of photons absorbed by the photocatalyst and the number of molecules which undergo photo-chemical reaction. According to the invention, the wattage of the fluorescent lamp and the distance between the photocatalytic thin film on the tiles and the lamp are fixed so that the total incident light intensity of the lamp is 50 to 350 lux.

Since in the process of the invention a photocatalyst in the form of a thin film is employed and this film presents increasing quantum efficiency with decreasing UV intensity, the use of fluorescent lamp, of limited UV intensity may be advantageously used to photo-excite the photocatalyst. As the light source is turned on, the thin film of photo catalyst is excited by the UV light, the surface hydroxyl groups are oxidized into OH radical and the surface oxygen is reduced to super oxide ions due to the redox action of generated electrons and holes. These species are highly active and when the stains of chilly or turmeric are brought into contact with the surface, they are decomposed into smaller molecules or ions. In this regards it is considered that chilly and turmeric stains containing chromophoric organics species is chemically decomposed by the active species generated in the process.

The following examples are given by way of illustration and therefore should not be construed to limit the scope of the present invention.

Example 1

5 gm of photocatalyst $TiO_2$ mixed with 100 ml of 2% concentration of colloidal silica sol and stirred for 2 hours and sonicated for 30 minutes. This mixture was uniformly sprayed on rough surface of ceramic tile using sprayings machine. The tile was calcined at 450° C. for 3 hours with increase in temperature at the rate of 3° C. per minute.

In 25 ml of water, 0.5 gm of turmeric and 1.0 gm of chilly was thoroughly mixed, heated to 50° C. to get good dispersion of the turmeric and chilly. The patch of above mixture of 1 cm wide was applied on the ceramic tile coated with photocatalyst horizontally and this tile was kept under fluorescent light. The distance between photocatalyst coated tile and tube light was 2 feet and the intensity of the light was 250 lux. The 75% colour was removed in 26 hours under the tube light.

Example 2

5 gm of photocatalyst $TiO_2$ mixed with 100 ml of 4% concentration of colloidal silica sol and stirred for 2 hours and sonicated for 30 minutes. This mixture was uniformly sprayed on rough surface of ceramic tile using sprayings machine. The tile was calcined at 350° C. for 3 hours with increase in temperature at the rate of 3° C. per minute.

In 20 ml of water, 5 ml of vegetable oil, 0.5 gm of turmeric and 1 gm of chilly was thoroughly mixed, heated to 50° C. to get good dispersion of the turmeric and chilly. The patch of above mixture of 1 cm wide was applied on the ceramic tile coated with photocatalyst horizontally and this tile was kept under fluorescent light. The distance between coated tile and fluorescent light was 3 feet and the intensity of the light was 250 lux. The 100% colour was removed in 22 hours.

Example 3

7 gm of photocatalyst $TiO_2$ mixed with 100 ml of 5% concentration of colloidal silica sol and stirred for 2 hours and sonicated for 30 minutes. This mixture was uniformly sprayed on rough surface of ceramic tile using sprayings machine. The tile was calcined at 450° C. for 3 hours with increase in temperature at the rate of 3° C. per minute.

In 20 ml of water, 5 ml of vegetable oil, 1 gm of turmeric and 2 gm of chilly was thoroughly mixed, heated to 50° C. to get good dispersion of the turmeric and chilly. The patch of above mixture of 1 cm, wide was applied on the ceramic tile coated with photocatalyst horizontally and this tile was kept under fluorescent light The distance between coated tile and fluorescent light was 2 feet and the intensity of light was 250 lux. The 100% colour was removed in 26 hours.

Example 4

3 gm of photocatalyst $TiO_2$ mixed with 100 ml of 5% concentration of colloidal silica sol and stirred for 2 hours and sonicated for 30 minutes This mixture was uniformly sprayed on rough surface of ceramic tile using sprayings machine. The tile was calcined at 450° C. for 3 hours with increase in temperature at the rate of 3° C. per minute.

In 25 ml of water, 1 gm of numeric and 2 gm of chilly was thoroughly mixed, heated to 50° C. to get good dispersion of the turmeric and chilly. The patch of above mixture of 1 cm wide was applied on the ceramic tile coated with photocatalyst horizontally and this tile was kept under the fluorescent light. The distance between coated tile and fluorescent light was 2 feet and the intensity of light was 116 lux. The 70% colour was removed in 42 hours.

Example 5

7 gm of photocatalyst $TiO_2$ was mixed with 100 ml of 5% concentration of colloidal silica sol and stirred for 2 hours and sonicated for 30 minutes. This mixture was uniformly sprayed on rough surface of ceramic tile using sprayings machine. Then tile was calcined at 350° C. for 3 hours with increase in temperature at the rate of 3° C. per minute.

In 20 ml of water, 5 ml of vegetable oil, and 5 gm of turmeric was thoroughly mixed, heated to 50° C. to get good dispersion of the turmeric and chilly. The patch of above mixture of 1 cm wide was applied on the ceramic the coated with photocatalyst horizontally and this tile was kept under the fluorescent light. The distance between coated tile and fluorescent light was 2 feet and the intensity of light was 116 lux. 100% colour was removed in 21 hours.

Example 6

5 gm of photocatalyst $TiO_2$ was mixed with 100 ml of 6% concentration of colloidal silica sol and stirred for 2 hours and sonicated for 30 minutes. This mixture was uniformly sprayed on rough surface of ceramic tile using sprayings machine. Then tile was calcined at 350° C. for 3 hours with increase in temperature at the rate of 3° C. per minute.

In 20 ml of water 5 ml of vegetable oil and 5 gm of chilly was thoroughly mixed, heated to 50° C. to get good dispersion of the turmeric and chilly. The patch of above mixture of 1 cm wide was applied on the ceramic tile coated with photocatalyst horizontally and this tile was kept under the fluorescent light. The distance between photocatalyst coated tile and tube light was 1 feet and the intensity of light was 116 lux. The 100% colour was removed in 30 hours.

Example 7

10 gm of photocatalyst $TiO_2$ was mixed with 100 ml of 7% concentration of colloidal silica sol and stirred for 2 hours and sonicated for 30 minutes. This mixture was uniformly sprayed on rough surface of ceramic the using sprayings machine. Then tile was calcined at 450° C. for 3 hours with increase in temperature at the rate of 3° C. per minute.

In 20 ml of water, 5 ml of vegetable oil and 0.5 gm of turmeric and 2 gm of chili was thoroughly mixed, heated to 50° C. to get good dispersion of the turmeric and chilly. The patch of above mixture of 1 cm wide was applied on the ceramic tile coated with photocatalyst horizontally and this tile was kept under the fluorescent light. The distance between photocatalyst coated the and fluorescent light was 3 feet and the intensity of light was 350 lux. The 100% colour was removed in 46 hours.

Example 8

10 gm of photocatalyst $TiO_2$ was mixed with 100 ml of 7% concentration of sodium silicate and stirred for 2 hours and sonicated for 30 minutes. This mixture was uniformly sprayed on rough surface of ceramic tile using sprayings machine. Then tile was calcined at 450° C. for 3 hours with increase in temperature at the rate of 3° C. per minute.

In 20 ml of water, 5 ml of vegetable oil and 0.5 gm of turmeric and 2 gm of chilli was thoroughly mixed, heated to 50° C. to get good dispersion of the turmeric and chilly. The patch of above mixture of 1 cm wide was applied on the ceramic tile coated with photocatalyst horizontally and this tile was kept under the fluorescent light. The distance between photocatalyst coated tile and fluorescent light was 3 feet and the intensity of light was 350 lux. The 70% colour was removed in 76 hours.

Example 9

10 gm of photocatalyst $TiO_2$ was mixed with 100 ml of 5% concentration of sodium silicate and stirred for 2 hours and sonicated for 30 minutes. This mixture was uniformly sprayed on rough surface of ceramic tile using sprayings machine. Then tile was calcined at 450° C. for 3 hours with increase in temperature at the rate of 3° C. per minute.

In 20 ml of water, 0.5 gm of turmeric and 2 gm of chilli was thoroughly mixed, heated to 50° C. to get good dispersion of the turmeric and chilly. The patch of above mixture of 1 cm wide was applied on the ceramic tile coated with photocatalyst horizontally and this tile was kept under the fluorescent light. The distance between photocatalyst coated tile and fluorescent light was 3 feet and the intensity of light was 350 lux. The 50% colour was removed in 76 hours.

Example 10

10 gm of photocatalyst $TiO_2$ was mixed with 100 ml of 3% concentration of sodium silicate and stirred for 2 hours and sonicated for 30 minutes. This mixture was uniformly sprayed on rough surface of ceramic tile using sprayings machine. Then tile was calcined at 450° C. for 3 hours with increase in temperature at the rate of 3° C. per minute.

In 20 ml of water, 5 ml of vegetable oil and 1 gm of turmeric and 3 gm of chilli was thoroughly mixed, heated to 50° C. to get good dispersion of the turmeric and chilly. The patch of above mixture of 1 cm wide was applied on the ceramic tile coated with photocatalyst horizontally and this tile was kept under the fluorescent light. The distance between photocatalyst coated tile and fluorescent light was 3 feet and the intensity of light was 350 lux. The 60% colour was removed in 76 hours.

We claim:

1. A process for photocatalytically cleaning stains on a surface, the process consisting essentially of the following steps in sequence:
   i) before a stain deposits on the surface, coating the surface with a thin film of a photo-catalytic semi-conductor material having a band gap energy;

ii) providing a fluorescent lamp emitting visible light of desired sufficient intensity, the lamp emitting light having wavelength greater than 300 nm and UV radiation having a band gap energy higher than the semi-conductor in order to photoexcite the semiconductor particulate;

iii) energizing the lamp to illuminate surrounding ambience of the surface and impinge UV radiation and visible light on the thin film; and iv) after a stain deposits on the semiconductor coated surface, exposing the stain on the semiconductor coated surface to fluorescent light to photocatalytically decompose the stain.

2. A method as claimed in claim 1 wherein the surface is a fixture tile or a platform.

3. A method a claimed in claim 1 wherein the stain is caused by a spice selected from chili and turmeric in emulsion with oil and water.

4. A method as claimed in claim 1 wherein the photocatalytic semi-conductor material having a band gap energy is $TiO_2$.

5. A process is claimed in claim 1, wherein the ambience is a domestic kitchen, restaurant kitchen, hospital kitchen or a hotel kitchen.

6. A process as claimed in claim 1, wherein the film is impinged by a fluorescent light having about 10% of UV radiation with an intensity of 100 to 350 lux.

7. A process as claimed in claim 1, wherein the light source is a fluorescent lamp capable of emitting light including UV radiation having a wavelength of 300 to 700 nm.

8. A process as claimed in claim 1, wherein the semiconductor material is anatase form of $TiO_2$.

9. A process as claimed in claim 1, wherein the film has a thickness in the range of 0.5 to 5.0 micrometers.

10. A process as claimed in claim 1 wherein the surface is a glazed tile which is roughened prior to spraying and heat curing.

11. A process as claimed in claim 1, wherein the fluorescent lamp is mounted at a distance of 1 to 3 feet from the surface.

12. A process as claimed in claim 1, wherein the contact time of stains on the surface with illumination is in the range of 2 to 6 hours.

13. A process as claimed in claim 1 wherein the semiconductor material is sprayed in the form of 2 to 5% of $TiO_2$ powder dispersed in 5 percent silica sol.

14. A process as claimed in claim 1 wherein the surface is dried and heated to a temperature in the range of 100 to 350° C. for 20 to 60 minutes after coating.

15. A process as claimed in claim 14 wherein the dried and heated tile is further sprayed with the semiconductor material and then dried and heated to a temperature in the range of 100 to 350° C. for 20 to 60 minutes.

16. A process as claimed in claim 1 wherein the photocatalyst is in powder form and contains at least 80% by weight of anatase type $TiO_2$ having a surface area in the range of 25 to 60 $m^2g^{-1}$ and X-ray diffraction peaks at 2θ=25.35 Å; 37.88 Å and 48.15 Å.

17. A process as claimed in claim 1 wherein the surface is a ceramic tile, plane glass or a hard acrylic sheet.

18. A process as claimed in claim 1 wherein the stain is a chili or turmeric stain in the form of a water dispersion or emulsion with oil with a concentration range of 1 to 5%.

19. A process as claimed in claim 1 wherein the fluorescent light is varied in the range of 50 to 350 lux.

20. A process as claimed in claim 1 wherein the irradiation time is varied in the range of 20 to 50 hours.

* * * * *